(12) United States Patent
Chong et al.

(10) Patent No.: US 9,386,305 B2
(45) Date of Patent: Jul. 5, 2016

(54) LARGEST CODING UNIT (LCU) OR PARTITION-BASED SYNTAX FOR ADAPTIVE LOOP FILTER AND SAMPLE ADAPTIVE OFFSET IN VIDEO CODING

(71) Applicant: Qualcomm Incorporated, San Diego, CA (US)

(72) Inventors: In Suk Chong, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 13/682,293

(22) Filed: Nov. 20, 2012

(65) Prior Publication Data

US 2013/0136167 A1 May 30, 2013

Related U.S. Application Data

(60) Provisional application No. 61/564,215, filed on Nov. 28, 2011.

(51) Int. Cl.
*H04N 7/12* (2006.01)
*H04N 7/26* (2006.01)
*H04N 11/02* (2006.01)
(Continued)

(52) U.S. Cl.
CPC ......... *H04N 19/0006* (2013.01); *H04N 19/115* (2014.11); *H04N 19/117* (2014.11); *H04N 19/136* (2014.11); *H04N 19/17* (2014.11); *H04N 19/174* (2014.11); *H04N 19/18* (2014.11);
(Continued)

(58) Field of Classification Search
CPC ............ H04N 7/12; H04N 7/26; H04N 11/02
See application file for complete search history.

(56) References Cited

U.S. PATENT DOCUMENTS

2010/0074329 A1  3/2010  Fu et al.
2010/0111182 A1  5/2010  Karczewicz et al.
(Continued)

FOREIGN PATENT DOCUMENTS

WO  2011074924 A2  6/2011
WO  2011103482 A1  8/2011
WO  2011127828 A1  10/2011
WO  2011134641 A1  11/2011

OTHER PUBLICATIONS

Wiegand et al., al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
(Continued)

*Primary Examiner* — Sath V Perungavoor
*Assistant Examiner* — Patricia I Young
(74) *Attorney, Agent, or Firm* — Shumaker & Sieffert, P.A.

(57) ABSTRACT

This disclosure relates to techniques for performing sample adaptive offset (SAO) processes in a video coding process. A video coder may store sets of SAO information. The SAO information may include data indicative of offset values. The video coder may also store mapping information that maps at least some of the sets of SAO information for one or more sequence partitions of a frame of video data. Additionally, the video coder may perform the SAO processes for one of the partitions of the frame based on the stored SAO information and the stored mapping information.

56 Claims, 7 Drawing Sheets

(51) Int. Cl.
*H04N 19/66* (2014.01)
*H04N 19/115* (2014.01)
*H04N 19/70* (2014.01)
*H04N 19/61* (2014.01)
*H04N 19/117* (2014.01)
*H04N 19/136* (2014.01)
*H04N 19/18* (2014.01)
*H04N 19/174* (2014.01)
*H04N 19/17* (2014.01)
*H04N 19/82* (2014.01)

(52) U.S. Cl.
CPC ............... *H04N19/61* (2014.11); *H04N 19/70* (2014.11); *H04N 19/82* (2014.11)

(56) References Cited

U.S. PATENT DOCUMENTS

| | | |
|---|---|---|
| 2011/0222608 A1 | 9/2011 | Gao et al. |
| 2011/0274158 A1 | 11/2011 | Fu et al. |
| 2011/0305274 A1 | 12/2011 | Fu et al. |

OTHER PUBLICATIONS

Bross et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 2012, JCTVC-I100_d21, pp. 290.
Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, pp. 226.
Bross et al., "WDS: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), pp. 214.
Fu et al., "Sample Adaptive Offset with LCU-based Syntax", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: HTTP://WFTP3.ITU.INT/AV-ARCH/JCTVC-SITE/, No. JCTVC F056, Jul. 15. 2011, XP030009079, pp. 1-4.
Fuldseth et al., "Improved ALF with low latency and reduced complexity" 98. MPEG Meeting; Nov. 28, 2011-Feb. 12, 2011; Geneva; (Motion Picture Expert Group or ISO/IEC JTC1/SC29/WG11) No. m22063 Nov. 22, 2011, XP030050626, pp. 1-3.
International Search Report and Written Opinion, dated Jan. 18, 2013 for corresponding PCT Application No. PCT/US2012/066250—ISA/EPO—Jan. 18, 2013.
ITU-T H.264, Series H: Audiovisual and Multimedia Systems, Infrastructure of audiovisual services—Coding of moving video, Advanced video coding for generic audiovisual services, The International Telecommunication Union. Jun. 2011, pp. 674.
Wiegand et al., "WD3: Working Draft 3 of High-Efficiency Video Coding," Document JCTVC-E603, 5th Meeting: Geneva, CH, Mar. 16-23, 2011, pp. 193.
Wiegand et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].

Bross, B., et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pages.
Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pages.
ITU-T H.265, Series H: Audiovisual and Multimedia Systems, Infrastructure of audiovisual services—Coding of moving video, High efficiency video coding, The International Telecommunication Union, Apr. 2013, 317 pages.
Taiwan Search Report—TW101144589—TIPO—Feb. 6, 2015.
Chen C-Y., et.al., "Non-CE8: One-stage non-deblocking Loop Filtering", [online], Nov. 21, 2011, Joint Collaborative Team on Video Coding (JCT-VC) of ITU-T SG16 WP3 and ISO/IEC JTC1/SC29/WG11, Document: JCTVC-G218 (version 3) (4 pages).
C-Y Tsai., et al., "Non-CE8: Pure VLC for SAO and ALF", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: HTTP://WFTP3.1TU.INT/AV-ARCH/JCTVC-SITE/,, No. JCTVC-G220, XP030110204, Nov. 8, 2011, 5 pages.
Fu C.M., et al., "CE13: Sample Adaptive Offset with LCU-Independent Decoding", Joint Collaborative Team on Video Coding (JCT-VC) of ITU-T SG16 WP3 and ISO/IEC JTC1/SC29/WG11 5th Meeting: Geneva, CH, Mar. 16-23, 2011, U.S., JCTVC, Mar. 10, 2011, XP030008555, JCTVC-E049, p. 1-6, URL, http://phenix.it-sudparis.eu/jct/index.php.
Fuldseth A., et.al., "CE8: ALF with low latency and reduced complexity for HEVC", [online], Nov. 15, 2011, Joint Collaborative Team on Video Coding (JCT-VC) of ITU-T SG16 WP3 and ISO/IEC JTC1/SC29/WG11, Document: JCTVC-G498 (version 4) (4 pages).
Kim W-S., et.al., "Non-CE8: Reduced number of Band Offsets in SAO", [online], Nov. 21, 2011, Joint Collaborative Team on Video Coding (JCT-VC) of ITU-T SG16 WP3 and ISO/IEC JTC1/SC29/WG11, Document: JCTVC-G682 (version 2) (7 pages).
Maani E., et.al., "Low Complexity Parametric Adaptive Loop Filter", [online], Jan. 26, 2011, Joint Collaborative Team on Video Coding (JCT-VC) of ITU-T SG16 WP3 and ISO/IEC JTC1/SC29/WG11, Document: JCTVC-D270_r1 (version 5) (3 pages).
McCann K., et al., "HM4: HEVC Test Model 4 Encoder Description" , 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/, No. JCTVC-F802, Oct. 4, 2011, XP030009799, sections 5.4.1, 5.4.2 (36 pages).
Japanese Office Action from corresponding Japanese Patent Application No. 2014-543556 dated Oct. 13, 2015 including translation (21 pages).
Korean Office Action from corresponding Korean Application Serial No. 2014-7017634 dated Jul. 31, 2015 , 8 pp.
Response to European Office Action from corresponding European Application Serial No. 12795710.8 dated Oct. 8, 2015, 5 pp.
Bross et al. "High efficiency video coding (HEVC) text specification draft 9," 11th Meeting: Shanghai, CN Oct. 10-19, 2012, JCTVC-K1003_v7, 290 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
ITU-T H.265, Series H: Audiovisual and Multimedia Systems, Infrastructure of audiovisual services—Coding of moving video, Advanced video coding for generic audiovisual services, The international Telecommunication Union. Apr. 2013, 317 pp.
Second Written Opinion from International Application No. PCT/US2012/066250, dated Oct. 29, 2013, 6 pp.
International Preliminary Report on Patentability from International Application No. PCT/US2012/066250, dated Feb. 26, 2014, 8 pp.

| ALF+SAO(F1) | COPY_L | ALF+SAO(F2) | COPY_L |
| --- | --- | --- | --- |
| OFF | COPY_U | ALF+SAO(F3) | COPY_L |
| COPY | ... | ... | ... |
| ... | ... | ... | ... |

Example 1:

| F1 | COPY_L | F2 | COPY_L | OFF |
| --- | --- | --- | --- | --- |

Example 2:

| F1 | F2 |
| --- | --- |

| NEW | COPY_L | NEW | COPY_U | OFF |
| --- | --- | --- | --- | --- |

FIG. 1

LARGEST CODING UNIT (LCU) OR PARTITION-BASED SYNTAX FOR ADAPTIVE LOOP FILTER AND SAMPLE ADAPTIVE OFFSET IN VIDEO CODING

This application claims the benefit of U.S. Provisional Application No. 61/564,215, filed Nov. 28, 2011, the entire content each of which is incorporated herein by reference.

TECHNICAL FIELD

This disclosure relates to video coding and, more particularly to techniques for performing sample adaptive offset (SAO) or adaptive loop filter (ALF) processes in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction, temporal prediction, or both to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. In particular, this disclosure describes techniques for performing sample adaptive offset (SAO) and adaptive loop filter (ALF) processes in a video coding process. In some examples, the disclosure describes the use of largest coding unit (LCU)-based, or other partition-based, syntax for use in ALF and SAO processes.

To support LCU- or partition-based syntax, a video coder (i.e., a video encoder or decoder) may store sets of ALF information, SAO information, or both ALF and SAO information. Sets of ALF information may include sets of filter coefficients. Sets of SAO information may include offsets values. Mapping information may indicate a mapping between the sets of ALF and/or SAO information and LCU's and/or other partitions. This information may be organized in a variety of different ways, in accordance with various examples of this disclosure.

In one example, the disclosure describes a method for performing sample adaptive offset (SAO) processes in a video coding process, the method including storing sets of SAO information, the SAO information comprising data indicative of offset values, storing mapping information that maps at least some of the sets of SAO information for one or more sequence partitions of a frame of video data, and performing the SAO processes for one of the partitions of the frame based on the stored SAO information and the stored mapping information.

In another example, the disclosure describes a video coder for performing adaptive loop filter (ALF), sample adaptive offset (SAO) processes, or both ALF and SAO processing in a video coding process, the video coder including a memory, a processor configured to: store sets of SAO information in the memory, the SAO information comprising data indicative of offset values, and store mapping information that maps at least some of the sets of SAO information for one or more sequence partitions of a frame of video data in the memory, and perform SAO offsetting on one of the partitions of the frame based on the stored SAO information and the stored mapping information.

In another example, the disclosure describes a video coder for performing sample adaptive offset (SAO) processes for a video coding process, the video coder including means for storing sets of SAO information, the SAO information comprising data indicative of offset values, and means for storing mapping information that maps at least some of the sets of SAO information for one or more sequence partitions of a frame of video data, and means for performing the SAO processes for one of the partitions of the frame based on the stored SAO information and the stored mapping information.

In one example, the disclosure describes a computer-readable storage medium having stored thereon instructions. The instructions, when executed, cause one or more processors of a device to store sets of SAO information, the SAO information comprising data indicative of offset value, and store mapping information that maps at least some of the sets of SAO information for one or more sequence partitions of a frame of video data.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is a conceptual diagram showing an example of how to code filter (ALF, SAO, or both) information and mapping information for LCU-based coding of such information.

DETAILED DESCRIPTION

Figure 2:
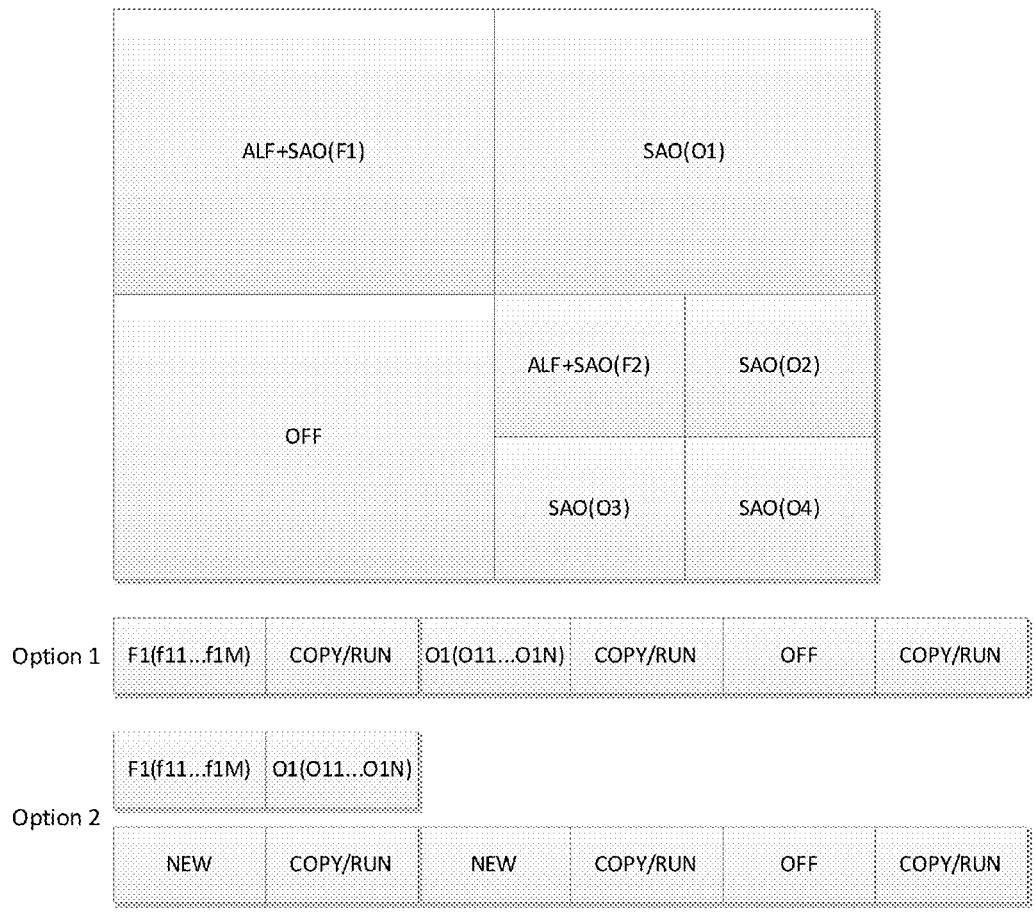
FIG. 2 is a conceptual diagram showing an example of how to code filter (ALF, SAO, or both) information and mapping information for frame-based or slice-based coding of such information.

In general, this disclosure describes techniques for coding video data and, more particularly, performing sample adaptive offset (SAO) or adaptive loop filter (ALF) processes in a video coding process. In some examples, the disclosure describes the use of largest coding unit (LCU)-based, or other partition-based, syntax for use in ALF and SAO processes. To support LCU-based or other partition-based syntax, a video coder (i.e., a video encoder or decoder) may store sets of processing data, for example one or more of ALF coefficient information, SAO information, or both and mapping information indicating a mapping between the sets of processing data and LCU's, other partitions, or both LCU's and other partitions.

For example, a video encoder or video decoder may store such information for use in ALF processes, SAO processes, or both ALF processes and SAO processes, of a video coding process. The video encoder may use the information in ALF processes, SAO processes, or both ALF processes and SAO processes and encode the information as syntax elements in an encoded video bitstream. A video decoder may decode the video bitstream to obtain and store the syntax elements for use in ALF processes, SAO processes, or ALF and SAO processes of a video decoding process. This information may be organized in a variety of different ways, in accordance with various examples of this disclosure. In some examples, the ALF processes, SAO processes, or ALF and SAO processes may be performed in-loop. In some examples, such processes may be performed post-loop.

Sample Adaptive Offset is a per-pixel operation that has two basic modes. The first mode is Edge Offset, of which there are 4 variations. Sample Adaptive Offset operates by comparing the value of a pixel to two of its eight neighbors (depending on the mode variation). Based on the magnitude differences, one of four possible offsets is added to the pixel. The second mode is referred to as Band Offset, where a pixels within a certain magnitude range get one of four offsets added. The filter mode and four offsets are chosen by the encoder for each Coded Tree Block in an attempt to get the pixels in that block to more closely match the source material.

In general, Adaptive loop filtering is an adaptive filtering technique applied after the deblocking filter to improve the reference picture used for encoding or decoding of subsequent pictures. In some examples, ALF may use square filters and be carried out on entire deblocked pictures. In other examples, ALF might be enabled and disabled on a block basis.

In some video coding processes, such as versions of the high efficiency video coding (HEVC) process presently under development, loop filters such as ALF and SAO signal filters, offset data, or filters and offset data in an adaptation parameter set (APS) syntax. In such a coding, the syntax for ALF and SAO is based on frame-based syntax. To support more flexible operation and encoder/decoder design, it is desirable to provide an LCU (or other partition)-based syntax for ALF and SAO processes. For example, in hardware implementations, it may be better to apply such filtering processes at the partition level, e.g., at LCU level.

In this disclosure, the ALF and SAO techniques will be described in the context of an LCU as a partition, i.e., with LCU-based syntax. However, the ALF and SAO techniques may be used with syntax based on other types of partitions. In addition, the disclosure describes the use of LCU (or other partition)-based syntax processes for ALF processes SAO processes, or both ALF and SAO processes but without limitation to other types of filter information. In general, this disclosure proposes a new syntax for ALF and SAO parameters that supports LCU-based processing.

Digital video devices implement video compression techniques to encode and decode digital video information more efficiently. Video compression may apply spatial (intra-frame) prediction, temporal (inter-frame) prediction, or both spatial and temporal prediction techniques to reduce or remove redundancy inherent in video sequences.

A typical video encoder partitions each frame of the original video sequence into contiguous rectangular regions called "blocks" or "coding units." These blocks are encoded in "intra mode" (I-mode), or in "inter mode" (P-mode or B-mode).

For P- or B-mode, the encoder first searches for a block similar to the one being encoded in a "reference frame," denoted by $F_{ref}$. Searches are generally restricted to being no more than a certain spatial displacement from the block to be encoded. When the best match, i.e., predictive block or "prediction," has been identified, it is expressed in the form of a two-dimensional (2D) motion vector ($\Delta y$, $\Delta y$), where $\Delta x$ is the horizontal and $\Delta y$ is the vertical displacement of the position of the predictive block in the reference frame relative to the position of the block to be coded. The motion vectors together with the reference frame are used to construct predicted block $F_{pred}$ as follows:

$$F_{pred}(x,y) = F_{ref}(x+\Delta x, y+\Delta y)$$

The location of a pixel within the frame is denoted by (x, y). For blocks encoded in I-mode, the predicted block is formed using spatial prediction from previously encoded neighboring blocks within the same frame. For both I-mode and P- or B-mode, the prediction error, i.e., the difference between the pixel values in the block being encoded and the predicted block, is represented as a set of weighted basis functions of some discrete transform, such as a discrete cosine transform (DCT). Transforms may be performed based on different sizes of blocks, such as 4×4, 8×8 or 16×16 and larger. The shape of the transform block is not always square. Rectangular shaped transform blocks can also be used, e.g. with a transform block size of 16×4, 32×8, etc.

The weights (i.e., the transform coefficients) are subsequently quantized. Quantization introduces a loss of information, and as such, quantized coefficients have lower precision than the original transform coefficients.

Quantized transform coefficients and motion vectors are examples of "syntax elements." These syntax elements, plus some control information, form a coded representation of the video sequence. Other examples of syntax elements include ALF information, SAO information, or both ALF and SAO information as described in this disclosure. Syntax elements may also be entropy coded, thereby further reducing the number of bits needed for their representation. Entropy coding is a lossless operation aimed at minimizing the number of bits required to represent transmitted or stored symbols (in our case syntax elements) by utilizing properties of their distribution (some symbols occur more frequently than others).

In the decoder, the block in the current frame is obtained by first constructing its prediction in the same manner as in the encoder, and by adding to the prediction the compressed prediction error. The compressed prediction error is found by weighting the transform basis functions using the quantized coefficients. The difference between the reconstructed frame and the original frame is called reconstruction error.

The compression ratio, i.e., the ratio of the number of bits used to represent the original sequence and the compressed one, may be controlled by adjusting the value of the quantization parameter (QP) used when quantizing transform coefficients. The compression ratio may depend on the method of entropy coding employed.

For video coding according to the high efficiency video coding (HEVC) standard currently under development by the Joint Cooperative Team for Video Coding (JCT-VC), as one example, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

According to the HM, a CU may include one or more prediction units (PUs), one or more transform units (TUs), or both one or more PUs and one or more TUs. Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block", "partition," or "portion" to refer to any of a CU, PU, or TU. In general, "portion" may refer to any sub-set of a video frame.

Sample adaptive offset (SAO) coding is currently under consideration for adoption into the HEVC standard. In general, the addition of offset values to pixels in a video frame (e.g., a predictive frame for inter-prediction or intra-prediction) may improve coding during illumination changes between frames of a video sequence, e.g., such as during flashes, a darkening sky, or other types of illumination changes between frames. Such illumination changes may add a relatively uniform intensity change across the pixels in the frame. For example, offset values may be applied to pixels of a predicted video block in order to bias the values of the predictive video block so as to compensate for illumination changes. Previous video coding standards, such as H.264, applied offset types and values uniformly across entire blocks or frames of pixels. SAO techniques may allow for different offset values to be applied to different pixels (or blocks) depending on pixel (or block) classification metrics.

In the current adaptive loop filter (ALF) in HEVC, two adaptation modes (i.e., block and region adaptation) are proposed. For region adaptive mode, a frame is divided into 16 regions, and each region can have one set of linear filter coefficients (AC coefficients and one DC coefficient) and one region can share the same filter coefficients with other regions. For block based mode, each 4×4 block derives one class by computing metric using direction and activity information. For each class, one set of linear filter coefficients (AC coefficients and one DC coefficient) can be used and one class can share the same filter coefficients with other classes.

To support LCU-based syntax (or other partition-based syntax) for ALF or SAO processes, it is generally necessary for the video encoder, video decoder, or video encoder and video decoder to store i) sets of filters, offsets, or both filters and offsets for the ALF and SAO processes, i.e., ALF information, SAO information, or both ALF and Sao information and ii) a mapping between the sets of filters/offsets and corresponding LCUs to which the filter/offsets are applied to perform the ALF and SAO processes. ALF information, SAO information, or both ALF and SAO information may generally refer, for example, to ALF information, SAO information, or both, whether presented separately or in a combined, merged manner, and whether the information includes coefficients, offsets or other information. Mapping between a set of filters/offsets and an LCU may include one or more of the following example.

In an example, a video coder generates a flag for an LCU that indicates that new filters/offsets are assigned to the LCU. The flag may indicate that the LCU is to be assigned a new set of ALF information, SAO information, or both ALF and SAO information, which may include filter coefficients, offsets, or both filter coefficients and offsets. In some examples, the flag may further include an identification of a particular set, e.g., among a plurality of sets, of ALF information, SAO information, or ALF and SAO information to be assigned to the LCU. Alternatively, the flag may cause an encoder or decoder to select the next set of ALF information, SAO information, or both ALF and SAO information in a list or plurality of sets of ALF information, SAO information, or both ALF and SAO information, such that the flag indicates that the encoder or decoder should advance to the next available set of ALF information, SAO information, or both ALF and SAO information for the respective LCU.

In another example, a video coder generates a copy command for a current LCU that indicates that filter/offset information from a neighboring LCU should be copied for the current LCU. For example, ALF information, SAO information, or both ALF and SAO information, may be copied from a left neighbor LCU or upper neighbor LCU to the current LCU for use in ALF processes, SAO processes, or both ALF and SAO processes performed for the current LCU.

In another example, a video coder generates run information when multiple sequential LCUs share the same filters/offsets (i.e., number of sharing sequential LCUs). In this example, once a set of ALF information, SAO information, or both ALF and SAO information is specified for an LCU, the run information may indicate the number of consecutive LCU's that follow the respective LCU and share the same ALF information, SAO information, or both ALF and SAO information. The mapping information may follow some scanning order (e.g., such as a scanning order similar to the LCU/CU scanning order.) Note that this information can be stored in a number of ways. For example, in one example, both sets of filters/offsets and mapping information can be stored at each LCU level. In this case, the ALF information, SAO information, or ALF and SAO information may be stored in the LCU level with the mapping information. In an alternative example, The set of filters/offsets can be stored in an APS or in slice header, and the mapping information can be stored in the slice header. In another alternative example, The set of filters/offsets can be stored in the APS or slice header, and the mapping information can be stored in the LCU.

If the set of filters/offsets and mapping information are stored in the same place (i.e., the slice header), those two sets of information can be stored in any suitable way. For example, according to one particular example, the set of filters/offsets and mapping information are stored separately (as shown in example 2 in FIGS. 1 and 2). In this case, the set of filters/offsets may be stored independently of the mapping information. The mapping information may then reference the set of ALF information, SAO information, or both ALF and SAO information for application to particular LCU's (or other partitions). In an alternative example, the sets of filters/offset and mapping information are stored in an interleaved way (as shown in example 1 in FIGS. 1 and 2). In this case, the sets of filters/offsets may be presented and stored for each LCU (or other partition), e.g., in a sequential, interleaved manner, where particular filter/offset sets are presented for respective LCU's, and particular mapping information (e.g., copy or run length command) is presented for other LCU's.

The processes described in this disclosure may be performed by a video encoder or a video decoder. For example, a video encoder or video decoder may store such information for use in ALF processes, SAO processes, or both ALF and SAO processes of a video coding process.

FIG. 1 is a conceptual diagram showing an example of how to code filter (ALF, SAO, or both) information and mapping information for LCU-based coding of such information. FIG. 2 is a conceptual diagram showing an example of how to code filter (ALF, SAO, or both) information and mapping information for frame-based or slice-based coding of such information.

In the examples of FIG. 1 and FIG. 2, ALF+SAO refers to an example in which ALF and SAO can be performed in one stage; therefore, ALF and SAO data can be stored in one place. These ALF+SAO indications can replaced by "ALF" or SAO when ALF or SAO is used by itself, i.e., separately. For example, SAO may be used without ALF or ALF may be used without SAO. Also, a set of filters or offsets (i.e., Fi in FIG. 1 or FIG. 2) can contain more than one filter or offsets, e.g., if one region in FIG. 1 or FIG. 2 uses more than one filter based on activities.

FIG. 1 illustrates a plurality of LCU's. In general, ALF+SAO(F1) may refer to a first combined set of ALF and SAO information for a first LCU. Similarly, ALF+SAO(F2) and ALF+SAO(F3) may refer to second and third sets, respectively, of ALF and SAO information for other LCU's. COPY_L and COPY_U form mapping information that indicates that ALF information, SAO information, or both ALF and SAO information for a current LCU should be copied from, respectively, from a left or upper (i.e., above) neighboring LCU. OFF indicates that ALF processes, SAO processes, or both ALF and SAO processes are not applied to a particular LCU.

In FIG. 1, as an example, example 1 shows the interleaved storage and presentation of ALF information, SAO information, or ALF and SAO information with mapping information by a video coder, i.e., by a video encoder or decoder. According to example 1 of FIG. 1, a video coder indicates that a first LCU (in the upper left corner) is assigned, by F1, the set of ALF information, SAO information, or both ALF and SAO information corresponding to ALF+SAO(F1). The second LCU (to the right of the first LCU) is indicated by COPY_L as copying its ALF information SAO information, or both ALF and SAO information from the left neighbor. Hence, the second LCU has the same ALF assignment, SAO assignment, or both ALF and SAO assignment as the first LCU, i.e., ALF+SAO(F1). The video coder assigns, to the third LCU, by F2, the ALF information, SAO information, or both ALF and SAO information in ALF+SAO(F2). The fourth LCU is specified by the video coder as being assigned the COPY_L command, which results in the same ALF information, SAO information, or both ALF and SAO information as the third LCU. The fifth LCU is then indicated as OFF. This presentation of ALF information, SAO information, or both ALF and SAO information in an interleaved manner with mapping information may continue for the remaining LCU's.

As a further example, in example 2 of FIG. 1, the ALF information, SAO information, or both ALF and SAO information is stored separately as F1 and F2 for reference by the mapping information. In this case, the NEW flag indicates that the current LCU should be assigned a new set of filter/offset information, e.g., the next set of ALF information, and/or SAO information, or both ALF and SAO information that has been stored. For the first LCU, NEW indicates that ALF+SAO(F1) is to be assigned. COPY_L indicates that the left neighbor information is to be copied for the next LCU. NEW for the third LCU indicates that the next set of filter offset information, e.g., ALF+SAO(F2) indicated by F2, should be applied to the third LCU. COPY_U indicates that the upper neighbor information should be copied for the next LCU, and OFF indicates that ALF, SAO, or both ALF and SAO is off for the current LCU. If example 2 pertains to the first row of LCU's, in some examples, COPY_U may not be applied. Instead, COPY_L may be applied.

In the example of example 2, NEW indicates that the next set of filter/offset information (e.g., in a plurality of filter/offset sets F1, F2, etc.) may be selected for the current LCU. In other examples, other mapping information or the flag itself may be configured to provide an identification of a particular set of filter/offset information, among the plurality of sets of filter/offset information, to be assigned to a particular LCU. For example, the flag may be encoded, or additional mapping information may be provided, to convey an identification such as an index value that specifies the particular set of ALF information, SAO information, or both ALF and SAO information to be assigned to a particular LCU. The flag may be a multi-bit flag that encodes a value indicating selection of one of two or more sets of filter/offset information, or additional index value may be provided as an additional syntax element.

FIG. 2 illustrates an example of how to code filter and mapping information for a frame/slice-based encoding case. Different sets of ALF information, SAO information, or both ALF and SAO information may be assigned to different partitions. In example 1 of FIG. 2, mapping information can be stored in an interleaved manner with ALF information SAO information, or both ALF and SAO information. As shown, a first set of filter/offsets, indicated by ALF+SAO(F1), may be assigned to a partition, such as an LCU, and copy, run, or both types of coding can be used to apply the same set of filter/offsets to other partitions. For example, one or more COPY_L or COPY_U commands may be used as mapping information to apply a set of filter/offsets for a partition such as an LCU to other partitions, such as partitions in a region sharing the same ALF information, SAO information or both ALF and SAO information. A second set of filter/offsets is shown by ALF+SAO(F2). Alternatively, or additionally, one or more RUN commands may specify the number of consecutive partitions sharing the same set of filter/offsets. The COPY and RUN commands may be referred to, collectively, as COPY/RUN commands.

In example 1 of FIG. 2, following the COPY/RUN commands, a set of SAO information, indicated by SAO (O1), is specified for a partition such as an LCU. This is an example in which SAO information may be specified separately, without ALF information. In this example, a SAO(O1) may specify a first set of offsets to be used for the partition. Likewise, in some examples, ALF information may be specified separately, e.g., without SAO information. SAO(O2), SAO(O3), SAO(O4) may provide other sets of offsets. In some examples, O11 ... O1N may refer to a set of offsets for the first set SAO(O1), and f11 ... f1M) may refer to set of filter coefficients for ALF+SAO(F1). COPY/RUN elements may be stored to indicate application of the SAO offset information to other partitions. An OFF element may specify that ALF and SAO functions are not applied for another partition. COPY/RUN elements may be used to apply the OFF condition to other partitions. Also, additional sets of ALF, SAO, and/or ALF and SAO information may be stored for application to other partitions. Hence, the mapping information may be used to specify particular sets of ALF information, SAO information, or both ALF and SAO information for application to particular partitions, mapping information, or both partitions and mapping information may specify COPY and RUN elements to apply such information to individual partitions or regions of partitions.

In example 1 of FIG. 1, such ALF information, SAO information, or both ALF and SAO information may be interleaved with the mapping information. In example 2 of FIG. 2, the sets of filter information, offset information and filter/offset information may be stored separately from the mapping information. In this case, the mapping information, e.g., NEW, COPY, RUN, OFF, and the like may refer to the separately stored ALF information, SAO information, or both ALF and SAO information. As in the example of FIG. 1, the NEW flag may specify the next set of ALF information, SAO information, or both ALF and SAO information in a plurality of sets of such information for application to a partition. Alternatively, the NEW flag may include or be accompanies by identification information for a particular set of such information to be applied to the partition, such as a particular set of filter information, a particular set of offset information, or a particular set that combines filter and offset information. The COPY and RUN elements may be used in a manner similar to that described above to apply to a partition, such as an LCU, the same ALF information, SAO information, or both ALF and SAO information as a neighbor partition or apply the same information over a consecutive number of partitions.

Figure 3:
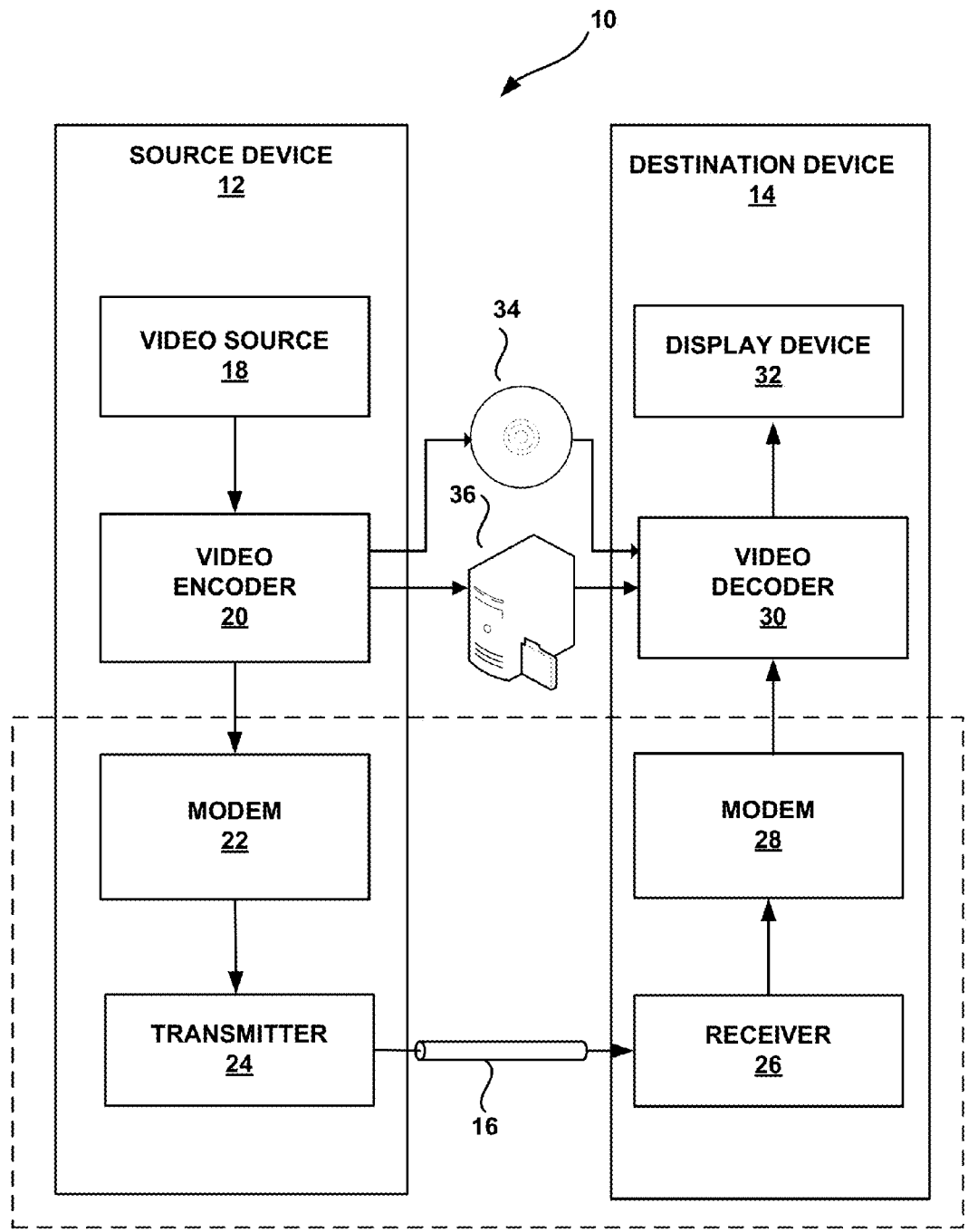
FIG. 3 is a block diagram illustrating an example video encoding and decoding system.

FIG. 3 is a block diagram illustrating an example video encoding and decoding system 10 that may be configured to utilize techniques for performing sample adaptive offset and adaptive loop filter processes in a video coding process in accordance with examples of this disclosure. As shown in FIG. 3, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for performing sample adaptive offset and adaptive loop filter processes in a video coding process, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, video telephony, or two or more of these.

In the example of FIG. 3, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless applications, wired applications, a combination of wired and wireless applications, or application in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 3, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 3, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 3, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for performing sample adaptive offset and adaptive loop filter processes in a video coding process. Likewise, the video decoder 30 may implement any or all of these techniques for performing sample adaptive offset and adaptive loop filter processes in a video coding process. A video coder, as described in this disclosure, may refer to a video encoder or a video decoder. Similarly, a video coding unit may refer to a video encoder or a video decoder. Likewise, video coding may refer to video encoding or video decoding.

For example a video coder such as video encoder 20 or video decoder 30, for example, may performing adaptive loop filter (ALF), sample adaptive offset (SAO) processes, or both ALF and SAO processing in a video coding process. The video encoder 20 or video decoder 30 may store sets of ALF information, SAO information, or both ALF and SAO information. Additionally, the video encoder 20 or video decoder 30 may store mapping information that maps at least some of the sets of ALF information, or SAO information for one or more sequence partitions of a frame of video data. One or more partitions may include one or more largest coding units (LCU's) of the frame of video data. The coder may perform at least one of ALF processes, SAO processes, or both ALF and SAO processes for one of the partitions of the frame based on the stored ALF information, SAO information, or based on stored ALF and SAO information, and the stored mapping information.

In an example, the mapping information may include at least one of (1) flag information that indicates whether a new filter a new offset, or both a new filter and new offset should be assigned to one of the partitions for use in the ALF process the SAO processes, or both the ALF and SAO process, (2) copy information indicating whether ALF information SAO information, or both ALF and SAO information should be copied to one of the partitions from another of the partitions for use in the ALF processes, SAO processes, or both ALF and SAO processes, or (3) run information indicating a number of the sequential partitions that share the same ALF information, SAO information, or both ALF and SAO information. The mapping information may further include an identification indicating one of the sets of ALF information, SAO information, or both ALF and SAO information to be assigned to the one of the partitions associated with the flag information.

In an example, the flag information may further include an identification indicating one of the sets of ALF information, SAO information, or both ALF and SAO information to be assigned to the one of the partitions associated with the flag information.

Figure 4:
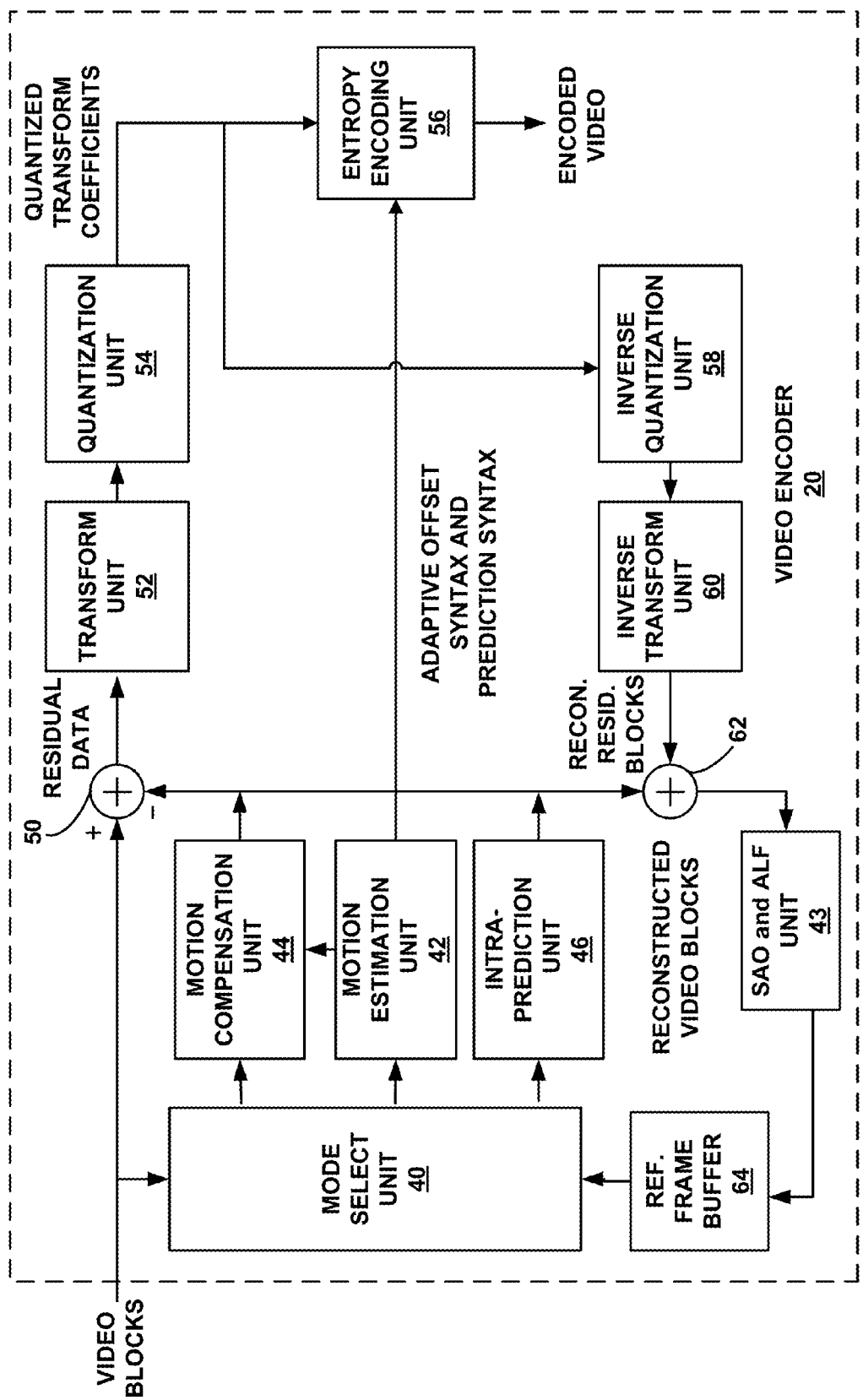
FIG. 4 is a block diagram illustrating an example video encoder.

FIG. 4 is a block diagram illustrating an example of a video encoder 20 that may use techniques for performing sample adaptive offset and adaptive loop filter processes in a video coding process as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 4, the video encoder 20 receives a current video block within a video frame to be encoded. In the example of FIG. 4, the video encoder 20 includes a motion compensation unit 44, a motion estimation unit 42, an intra-prediction unit 46, a reference frame buffer 64, a summer 50, a transform unit 52, a quantization unit 54, and an entropy encoding unit 56. The transform unit 52 illustrated in FIG. 4 is the unit that applies the actual transform or combinations of transform to a block of residual data, and is not to be confused with block of transform coefficients, which also may be referred to as a transform unit (TU) of a CU. For video block reconstruction, the video encoder 20 also may include an inverse quantization unit 58, an inverse transform unit 60, a summer 62, and an SAO and ALF unit 43. A deblocking filter may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on rate distortion results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform unit 60 for the block to reconstruct the encoded block, as described in greater detail below. Some video frames may be designated as I-frames, where all blocks in an I-frame are encoded in an intra-prediction mode. In some cases, the intra-prediction unit 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction unit 46 may intra-predict the received block, as an alternative to inter-prediction performed by the motion estimation unit 42 and the motion compensation unit 44. The intra-prediction unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., thirty-five directional prediction modes, based on the size of the CU being encoded.

The intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction unit 46 may calculate an error value for the prediction mode based on pixel differences between the PU and the received block to be encoded. The intra-prediction unit 46 may continue testing intra-prediction modes until an intra-prediction mode that yields an acceptable error value is discovered. The intra-prediction unit 46 may then send the PU to the summer 50.

The video encoder 20 forms a residual block by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform unit 52 may form one or more transform units (TUs) from the residual block. The transform unit 52 selects a transform from among a plurality of transforms. The transform may be selected based on one or more coding characteristics, such as block size, coding mode, or the like. The transform unit 52 then applies the selected transform to the TU, producing a video block comprising a two-dimensional array of transform coefficients. The transform unit 52 may signal the selected transform partition in the encoded video bitstream.

The transform unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CAVLC, CABAC, syntax-based context-adaptive binary arithmetic coding (SBAC), or another entropy coding methodology to the coefficients.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, transform type, or both block type and transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block. The SAO and ALF unit 43 may perform sample adaptive offset and adaptive loop filter processes in accordance with the techniques described above. The filtered reconstructed video block is then stored in the reference frame buffer 64. The reconstructed video block may be used by the motion estimation unit 42 and the motion compensation unit 44 as a reference block to inter-code a block in a subsequent video frame.

Additionally, the SAO and ALF unit 43 may determine a filter comprising ALF information, SAO information, or both the ALF and the SAO information. For example, the ALF information may include filter coefficients that are applied (e.g., filter taps) so as to generate a filtered value for a pixel, while the SAO information may include offset values that are used to bias pixel values. The SAO and ALF unit 43 may then generate a coded bitstream that may include the ALF information, the SAO information, or both the ALF and SAO information. The ALF and SAO information may be sent in the bitstream at the LCT or slice level.

Figure 5:
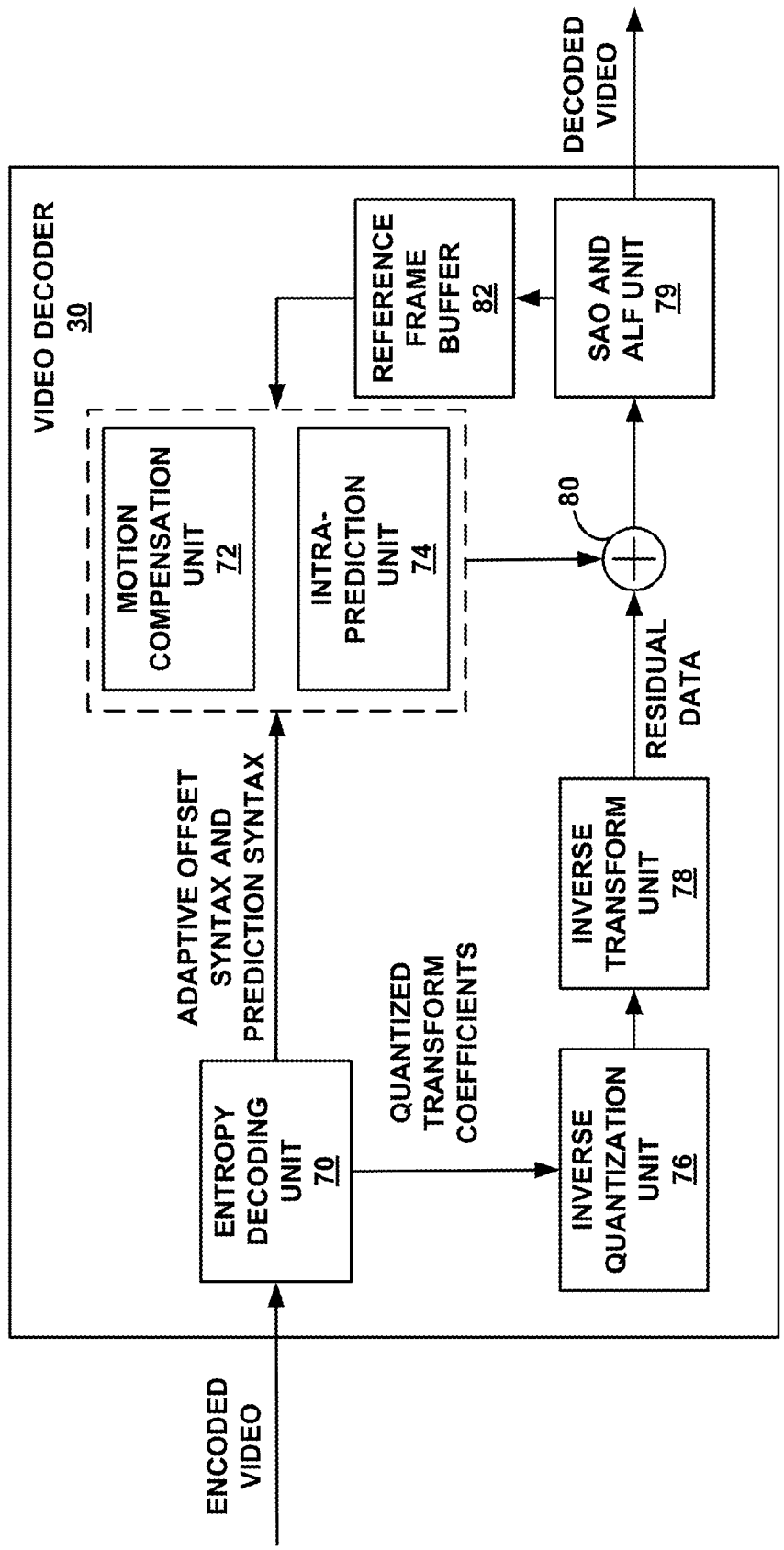
FIG. 5 is a block diagram illustrating an example video decoder.

FIG. 5 is a block diagram illustrating an example of a video decoder 30, which decodes an encoded video sequence. In the example of FIG. 5, the video decoder 30 may include an entropy decoding unit 70, a motion compensation unit 72, an intra-prediction unit 74, an inverse quantization unit 76, an inverse transformation unit 78, a reference frame buffer 82, a SAO and ALF unit 79, and a summer 80. The video decoder 30 may, in some examples, perform a decoding pass generally reciprocal to the encoding pass described with respect to the video encoder 20 (see FIG. 4).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform unit 78 applies an inverse transform to the inverse quantized transform coefficients. In some examples, the inverse transform unit 78 may determine an inverse transform based on signaling from the video encoder 20, or by inferring the transform from one or more coding characteristics such as block size, coding mode, or the like. In some examples, the inverse transform unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform unit 78 may apply a cascaded inverse transform, in which inverse transform unit 78 applies two or more inverse transforms to the transform coefficients of the current block being decoded.

The intra-prediction unit 74 may generate prediction data for a current block of a current frame based on a signaled intra-prediction mode and data from previously decoded blocks of the current frame.

Based on the retrieved motion prediction direction, reference frame index, and calculated current motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction unit 74, in an HEVC example, may use some of the syntax information (e.g., provided by a quadtree) to determine sizes of LCUs used to encode frame(s) of the encoded video sequence. The motion compensation unit 72 and the intra-prediction unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction unit 74 to form decoded blocks. The SAO and ALF unit 79 may perform techniques for sample adaptive offset and adaptive loop filter processes in accordance with the techniques described above. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 3). In an example, the SAO and ALF unit 79 may receive a coded bitstream that includes ALF information, SAO information, or both the ALF and SAO information. The decoder may then interpret the coded bitstream to select the correct filter to be used.

Figure 6:
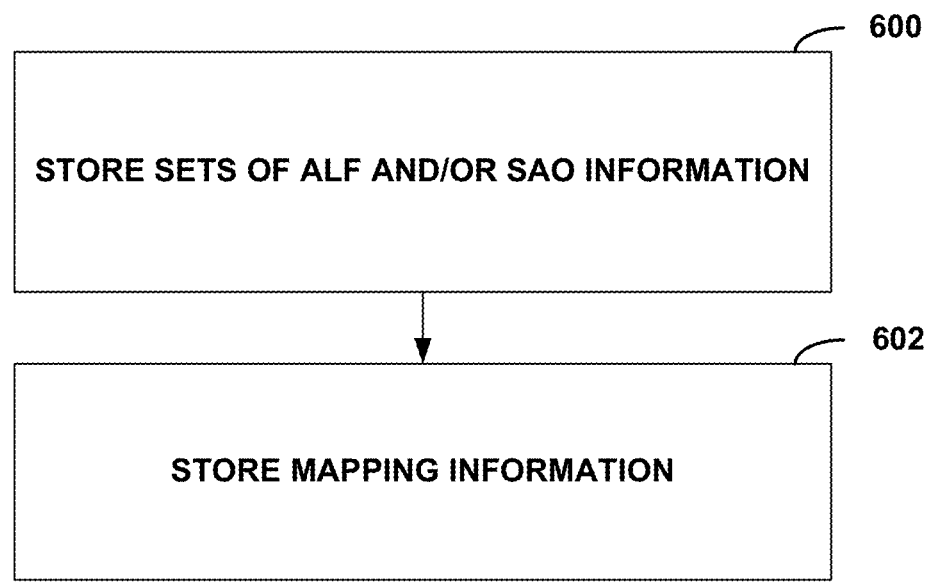
FIG. 6 is a flow chart illustrating an example method for performing adaptive loop filter (ALF), sample adaptive offset (SAO) processes, or both ALF and SAO processing in a video coding process in accordance with one or more examples described in this disclosure.

FIG. 6 is a flow chart illustrating an example method for performing adaptive loop filter (ALF), sample adaptive offset (SAO) processes, or both ALF and SAO processing in a video coding process in accordance with one or more examples described in this disclosure. The example method performs ALF, SAO processes, or both ALF and SAO processing in a video coding process.

In the example method of FIG. 6 a coder such as video encoder 20 or video decoder 30 may store sets of ALF information, SAO information, or both ALF and SAO information (600). For example, to support LCU-based or other partition-based syntax, a video coder (i.e., a video encoder or decoder) may store sets of ALF information, SAO information, or both, such as sets of filters, offsets, or both and mapping information indicating a mapping between the sets of ALF information, SAO information, or both ALF and SAO information and LCU's, other partitions, or both LCU's and other partitions. A video encoder or video decoder may store such information for use in ALF processes, SAO processes, or both ALF processes and SAO processes, of a video coding process. The video encoder may use the information in ALF processes, SAO processes, or both ALF processes and SAO processes and encode the information as syntax elements in an encoded video bitstream. A video decoder may decode the video bitstream to obtain and store the syntax elements for use in ALF processes, SAO processes, or ALF and SAO processes of a video decoding process. This information may be organized in a variety of different ways, in accordance with various examples of this disclosure. In some examples, the ALF processes SAO processes, or ALF and SAO processes may be performed in-loop. In some examples, such processes may be performed post-loop.

In the example method of FIG. 6 a coder such as video encoder 20 or video decoder 30 may store mapping information that maps at least some of the sets of ALF information, or SAO information for one or more partitions of a frame of video data (602). For example, the mapping information may follow some scanning order (e.g., such as a scanning order similar to the LCU/CU scanning order.) This information may be stored in each LCU level. In this case, the ALF information, SAO information, or ALF and SAO information may be stored in the LCU level with the mapping information. In another example, the set of filters/offsets can be stored in an APS or in the slice header. The set of filters/offsets can be stored in the APS or slice header and the mapping information can be stored in the LCU.

If the set of filters/offsets and mapping information are stored in the same place (i.e., the slice header), those two sets of information can be stored in two ways. First, the set of filters/offsets and mapping information may be stored separately (as shown in example 2 in FIGS. 1 and 2). In this case, the set of filters/offsets may be stored independently of the mapping information. The mapping information may then reference the set of ALF information, SAO information, or both ALF and SAO information for application to particular LCU's (or other partitions). Second, the sets of filters/offset and mapping information may be stored in an interleaved way (as shown in example 1 in FIGS. 1 and 2). In this case, the sets of filters/offsets may be presented and stored for each LCU (or other partition), e.g., in a sequential, interleaved manner, where particular filter/offset sets are presented for respective LCU's, and particular mapping information (e.g., copy or run length command) is presented for other LCU's.

In one example coder such as video encoder 20 or video decoder 30, the coder may store both the sets of ALF information, SAO information, or both ALF and SAO information and the mapping information as LCU level or a slice level syntax elements. The coder may store the sets of ALF information, SAO information, or both ALF and SAO information and the mapping information at an LCU level or the slice level either separately or in an interleaved manner. The coder may further store the sets of ALF information, SAO information, or both ALF and SAO information in an adaptation parameter set (APS) or slice header, and coding the mapping information in a slice header. In an example, the coder may store the sets of ALF information, SAO information, or both ALF and SAO information in an adaptation parameter set (APS) or slice header, and coding the mapping information at an LCU level.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

Figure 7:
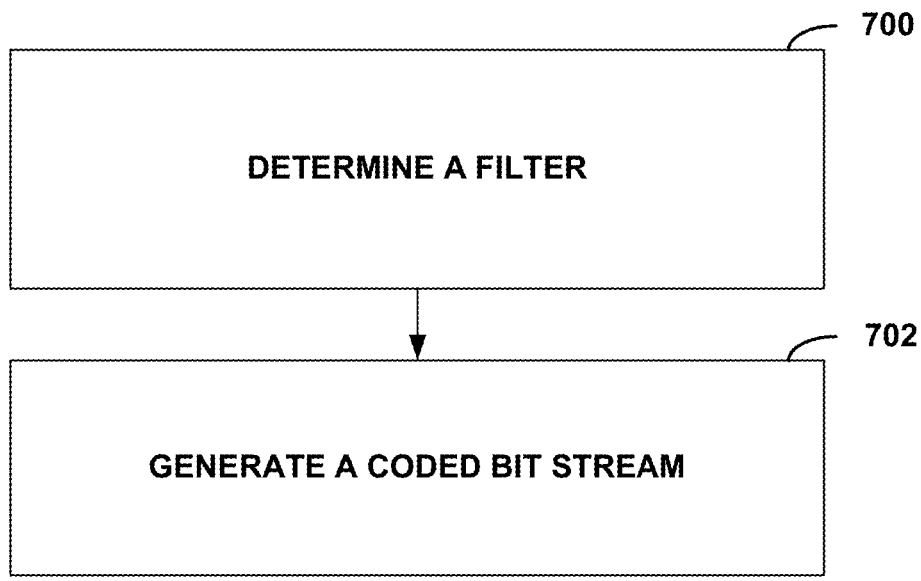
FIG. 7 is a flow chart illustrating an example method implemented in a video encoder in accordance with one or more examples described in this disclosure.

FIG. 7 is a flow chart illustrating an example method implemented in the video encoder 20 in accordance with one or more examples described in this disclosure. The SAO and ALF unit 43, within video encoder 20 may determine a filter comprising ALF information, SAO information, or both the ALF and the SAO information. For example, the ALF information may include filter coefficients that are applied (e.g., filter taps) so as to generate a filtered value for a pixel. SAO information may include offset values that are used to bias pixel values.

The SAO and ALF unit 43 may then generate a coded bitstream using the filter. Additionally, the coded bitstream may include the ALF information, the SAO information, or both the ALF and SAO information. The ALF and SAO information may be sent in the bitstream at the LCT or slice level. For example, filter coefficients that are applied (e.g., filter taps) and/or offset values that are used to bias pixel values may be sent in the bit stream. This may occur at the LCT or slice level which can allow for finer granularity when compared to sending such information at the frame level because filtering may be changed within a frame. In some examples, a flag may be sent at the LCU indicating the filtering used. In other examples syntax information may be sent at the LCU or partition level.

Figure 8:
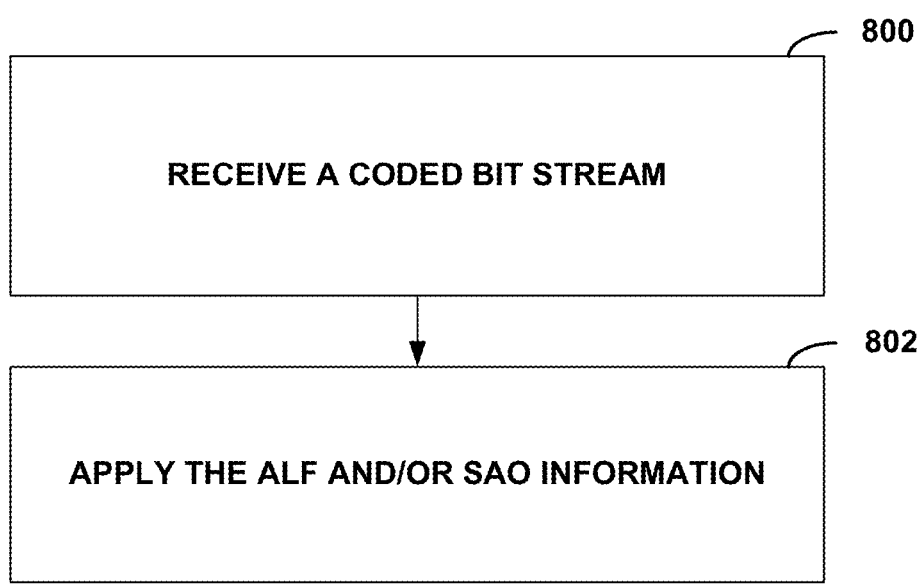
FIG. 8 is a flow chart illustrating an example method implemented in a video decoder in accordance with one or more examples described in this disclosure.

FIG. 8 is a flow chart illustrating an example method implemented in a video decoder 30 in accordance with one or more examples described in this disclosure. The SAO and ALF unit 79, within video decoder 30 may receive a coded bitstream. The coded bitstream may include the ALF information, the SAO information, or both the ALF and SAO information. The decoder interprets the coded bitstream to select the correct filter to be used. In other words, the video decoder 30 determines what filter the video encoder 20 selected. Additionally, the SAO and ALF unit 79 may apply the ALF information, the SAO information, or both the ALF and SAO information to decode the bitstream. For example, filter coefficients that are applied (e.g., filter taps) and/or offset values that are used to bias pixel values may be received in the received bitstream. Such examples allow for different filtering of different blocks rather than requiring all blocks within a frame to be filtered the same.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for performing filtering in a video encoding process, the method comprising:
    storing sets of filter information, wherein the filter information includes SAO information, the SAO information comprising data indicative of offset values;
    storing mapping information that maps one or more of the sets of SAO information to one or more largest coding units (LCU's) of a frame of video data;
    signaling one of the sets of SAO information in a bitstream at the LCU level as a LCU level syntax element such that the signaled set of SAO information is directed to and applied to a first LCU;
    signaling mapping information in the bitstream at the LCU level as a LCU level syntax element such that the signaled mapping information is directed to a second LCU, wherein the first and second LCU's are different LCU's;
    applying a set of SAO information applied to another LCU to the second LCU based on the mapping information directed to the second LCU; and
    performing SAO processes for each of the first and second LCU's based on the set of SAO information applied to each LCU.

2. The method of claim 1, wherein the mapping information comprises flag information that indicates whether a new filter, a new offset, or both the new filter and the new offset should be assigned to one of the LCU's.

3. The method of claim 1, wherein the mapping information comprises copy information indicating whether SAO information should be copied to one of the LCU's from another of the LCU's.

4. The method of claim 1, wherein the mapping information comprises run information indicating a number of the LCU's that share the same SAO information.

5. The method of claim 1, wherein the mapping information includes an identification indicating one of the sets of SAO information, to be assigned to the one of the LCU's associated with flag information.

6. The method of claim 1, wherein the mapping information includes flag information, wherein the flag information includes an identification indicating one of the sets of SAO information to be assigned to the one of the LCU's associated with the flag information.

7. The method of claim 1, wherein the mapping information includes a selected copy command, wherein the copy command is selected from copy commands including a copy from left LCU command and a copy from upper LCU command.

8. The method of claim 1, wherein the sets of SAO information and the mapping information are interleaved in the bitstream.

9. The method of claim 1, further comprising signaling the sets of SAO information and the mapping information as LCU level syntax elements separately in the bitstream.

10. The method of claim 1, further comprising:
    generating a coded bitstream using a filter, the coded bitstream including the SAO information,
    wherein signaling one of the sets of SAO information in the bitstream comprises encoding the one of the sets of SAO information into the bitstream,
    wherein signaling mapping information in the bitstream at the LCU level comprising encoding the mapping information into the bitstream, and
    wherein applying the SAO information, comprises applying the SAO information as part of performing the video encoding process in a video encoder.

11. The method of claim 1, wherein the filter information further includes adaptive loop filter (ALF) information, wherein the ALF information includes information relating to filter coefficients, the method further comprising:
    storing mapping information that maps one or more of the sets of ALF information to one or more LCU's of the frame of video data;
    signaling the sets of ALF information and the mapping information in the bitstream at the LCU level; and
    performing an ALF process for one of the LCU's of the frame based on one of the ALF information sets signaled in the bistream.

12. The method of claim 11, wherein the mapping information comprises at least one of:
    flag information that indicates whether a new filter, a new offset, or both the new filter and the new offset should be assigned to one of the LCU's for use in the ALF process;
    copy information indicating whether ALF information should be copied to one of the LCU's from another of the LCU's for use in the ALF processes; or
    run information indicating a number of the LCU's that share the same ALF information.

13. The method of claim 11, wherein the mapping information further includes a first identification indicating one of the sets of ALF information to be assigned to the one of the LCU's associated with flag information; and wherein the flag information further includes a second identification indicating one of the sets of ALF information to be assigned to the one of the LCU's associated with the flag information.

14. The method of claim 11, further comprising coding both the sets of ALF information and the mapping information as LCU level syntax elements, wherein the coding is done in an interleaved manner.

15. A video coder for performing adaptive loop filter (ALF), sample adaptive offset (SAO) processes, or both ALF and SAO processing in a video encoding process, the video coder comprising:
    a memory; and
    a processor configured to:
        store sets of filter information, wherein the filter information includes SAO information, the SAO information comprising data indicative of offset values; store mapping information that maps one or more of the sets of SAO information to one or more largest coding units (LCU's) of a frame of video data; code one of the sets of SAO information in a bitstream at the LCU level as a LCU level syntax element such that the coded set of SAO information is signaled in the bitstream at the LCU level and directed to and applied to a first LCU;
        code mapping information in the bitstream at the LCU level as a LCU level syntax element such that the coded mapping information is signaled in the bitstream at the LCU level and directed to a second LCU, wherein the first and second LCU's are different LCU's;

apply a set of SAO information applied to another LCU to the second LCU based on the mapping information directed to the second LCU; and perform SAO offsetting on the first LCU and on the second LCU based on the stored set of SAO information applied to each LCU.

16. The video coder of claim 15, wherein the mapping information comprises flag information that indicates whether a new filter, a new offset, or both the new filter and the new offset should be assigned to one of the LCU's.

17. The video coder of claim 15, wherein the mapping information comprises copy information indicating whether SAO information should be copied to one of the LCU's from another of the LCU's.

18. The video coder of claim 15, wherein the mapping information comprises run information indicating a number of the LCU's that share the same SAO information.

19. The video coder of claim 15, wherein the mapping information includes an identification indicating one of the sets of SAO information to be assigned to the one of the LCU's associated with flag information.

20. The video coder of claim 15, wherein the mapping information includes flag information, wherein the flag information includes an identification indicating one of the sets of SAO information to be assigned to the one of the LCU's associated with the flag information.

21. The video coder of claim 15, wherein the mapping information includes a selected copy command, wherein the copy command is selected from copy commands including a copy from left LCU command and a copy from upper LCU command.

22. The video coder of claim 15, wherein the processor is further configured to store the sets of SAO information and the mapping information as LCU level syntax elements separately.

23. The video coder of claim 15, wherein the processor is further configured to store the sets of SAO information and the mapping information as LCU level syntax elements in an interleaved manner.

24. The video coder of claim 15, wherein the video coder is a video encoder configured to perform a video encoding process, wherein the processor is further configured to:
generate a coded bitstream including the SAO information, wherein to code one of the sets of SAO information in the bitstream, the processor is configured to encode the one of the sets of SAO information into the bitstream,
wherein to code mapping information in the bitstream at the LCU level, the processor is configured to encode the mapping information into the bitstream, and
wherein, to apply the SAO information, the processor is configured to apply the SAO information as part of performing the video encoding process in the video encoder.

25. The video coder of claim 15, wherein the filter information further includes adaptive loop filter (ALF) information, wherein the ALF information includes information relating to filter coefficients, wherein the processor is further configured to:
store mapping information that maps one or more of the sets of ALF information to one or more LCU's of the frame of video data; and
perform an ALF process for one of the LCU's of the frame based on one of the ALF information sets coded in the bitstream.

26. The video coder of claim 25, wherein the mapping information comprises at least one of:

flag information that indicates whether a new filter, a new offset, or both the new filter and the new offset should be assigned to one of the LCU's for use in the ALF process;
copy information indicating whether ALF information should be copied to one of the LCU's from another of the LCU's for use in the ALF processes; or
run information indicating a number of the LCU's that share the same ALF information.

27. The video coder of claim 25, wherein the mapping information further includes a first identification indicating one of the sets of ALF information to be assigned to the one of the LCU's associated with flag information; and wherein the flag information further includes a second identification indicating one of the sets of ALF information to be assigned to the one of the LCU's associated with the flag information.

28. The video coder of claim 25, wherein the processor is further configured to code both the sets of ALF information and the mapping information in the bitstream at the LCU level as LCU level syntax elements, wherein the coding is done either separately or in an interleaved manner.

29. The method of claim 1, wherein the mapping information includes a copy left command.

30. The method of claim 1, wherein the mapping information includes a copy up command.

31. The video coder of claim 15, wherein the mapping information includes a copy left command.

32. The video coder of claim 15, wherein the mapping information includes a copy up command.

33. A method for performing filtering in a video decoding process, the method comprising:
storing sets of filter information, wherein the sets of filter information include sets of sample adaptive offset (SAO) information, the SAO information comprising data indicative of offset values;
receiving and applying a set of SAO information signaled in a bitstream at the largest coding unit (LCU) level as a LCU level syntax element, wherein applying includes applying the received set of SAO information to a first LCU of a frame of video data;
receiving mapping information signaled in the bitstream at the LCU level as a LCU level syntax element, wherein the received mapping information is directed to a second LCU, wherein the first and second LCU's are different LCU's;
applying a set of SAO information applied to another LCU to the second LCU based on the mapping information directed to the second LCU; and
performing SAO processes for each of the first and second LCU's based on the set of SAO information applied to each LCU.

34. The method of claim 33, wherein the mapping information comprises run information indicating a number of the LCU's that share the same SAO information.

35. The method of claim 33, wherein the mapping information includes an identification indicating one of the sets of SAO information, to be assigned to the one of the LCU's associated with flag information.

36. The method of claim 33, wherein the mapping information includes flag information, wherein the flag information includes an identification indicating one of the sets of SAO information to be assigned to the one of the LCU's associated with the flag information.

37. The method of claim 33, wherein the mapping information includes a selected copy command, wherein the copy command is selected from copy commands including a copy from left LCU command and a copy from upper LCU command.

38. The method of claim 33, wherein the sets of SAO information and the mapping information are interleaved in the bitstream.

39. The method of claim 33, wherein the sets of filter information further include sets of adaptive loop filter (ALF) information, wherein each set of ALF information includes information relating to filter coefficients, the method further comprising:
receiving ALF mapping information signaled in the bitstream at the LCU level as a LCU level syntax element, wherein the ALF mapping information maps one or more of the sets of ALF information to one or more LCU's of the frame of video data; and
performing an ALF process for the one or more LCU's of the frame of video data based on the ALF information mapped.

40. The method of claim 39, wherein the ALF mapping information comprises at least one of:
flag information that indicates whether a new filter, a new offset, or both the new filter and the new offset should be assigned to one of the LCU's for use in the ALF process;
copy information indicating whether ALF information should be copied to one of the LCU's from another of the LCU's for use in the ALF processes; or
run information indicating a number of the LCU's that share the same ALF information.

41. The method of claim 39, wherein the ALF mapping information comprises a first identification indicating one of the one or more sets of ALF information to be mapped and flag information that indicates whether a new filter, a new offset, or both the new filter and the new offset should be assigned to one of the LCU's for use in the ALF process.

42. The method of claim 39, wherein the sets of ALF information and the ALF mapping information are interleaved in the bitstream.

43. A video decoder for performing adaptive loop filter (ALF), sample adaptive offset (SAO) processes, or both ALF and SAO processing in a video coding process, the video decoder comprising:
a memory; and
a processor configured to:
store sets of filter information in the memory, wherein the sets of filter information include sets of sample adaptive offset (SAO) information, the SAO information comprising data indicative of offset values;
receive and apply a set of SAO information signaled in a bitstream at the largest coding unit (LCU) level as a LCU level syntax element, wherein applying includes applying the received set of SAO information to a first LCU of a frame of video data;
receive mapping information signaled in the bitstream at the LCU level as a LCU level syntax element, wherein the received mapping information is directed to a second LCU, wherein the first and second LCU's are different LCU's;
apply a set of SAO information applied to another LCU to the second LCU based on the mapping information directed to the second LCU; and
perform SAO processes for each of the first and second LCU's based on the set of SAO information applied to each LCU.

44. The video decoder of claim 43, wherein the mapping information comprises run information indicating a number of the LCU's that share the same SAO information.

45. The video decoder of claim 43, wherein the mapping information includes an identification indicating one of the sets of SAO information, to be assigned to the one of the LCU's associated with flag information.

46. The video decoder of claim 43, wherein the mapping information includes flag information, wherein the flag information includes an identification indicating one of the sets of SAO information to be assigned to the one of the LCU's associated with the flag information.

47. The video decoder of claim 43, wherein the mapping information includes a selected copy command, wherein the copy command is selected from copy commands including a copy from left LCU command and a copy from upper LCU command.

48. The video decoder of claim 43, wherein the sets of SAO information and the mapping information are interleaved in the bitstream.

49. The video decoder of claim 43, wherein the sets of filter information further include sets of adaptive loop filter (ALF) information, wherein each set of ALF information includes information relating to filter coefficients, the processor further configured to:
receive ALF mapping information signaled in the bitstream at the LCU level as a LCU level syntax element, wherein the ALF mapping information maps one or more of the sets of ALF information to one or more LCU's of the frame of video data; and
perform an ALF process for the one or more LCU's of the frame of video data based on the ALF information mapped.

50. The video decoder of claim 49, wherein the ALF mapping information comprises at least one of:
flag information that indicates whether a new filter, a new offset, or both the new filter and the new offset should be assigned to one of the LCU's for use in the ALF process;
copy information indicating whether ALF information should be copied to one of the LCU's from another of the LCU's for use in the ALF processes; or
run information indicating a number of the LCU's that share the same ALF information.

51. The video decoder of claim 49, wherein the ALF mapping information comprises a first identification indicating one of the one or more sets of ALF information to be mapped and flag information that indicates whether a new filter, a new offset, or both the new filter and the new offset should be assigned to one of the LCU's for use in the ALF process.

52. The video decoder of claim 49, wherein the sets of ALF information and the ALF mapping information are interleaved in the bitstream.

53. A video decoder, comprising:
means for storing sets of filter information, wherein the sets of filter information include sets of sample adaptive offset (SAO) information, the SAO information comprising data indicative of offset values;
means for receiving and applying a set of SAO information signaled in a bitstream at the largest coding unit (LCU) level as a LCU level syntax element, wherein applying includes applying the received set of SAO information to a first LCU of a frame of video data;
means for receiving mapping information signaled in the bitstream at the LCU level as a LCU level syntax element, wherein the received mapping information is directed to a second LCU, wherein the first and second LCU's are different LCU's;
means for applying a set of SAO information applied to another LCU to the second LCU based on the mapping information directed to the second LCU; and means for performing SAO processes for each of the first and second LCU's based on the set of SAO information applied to each LCU.

54. The video decoder of claim 53, wherein the sets of filter information further include sets of adaptive loop filter (ALF) information, wherein each set of ALF information includes information relating to filter coefficients, the decoder further comprising:
    means for receiving ALF mapping information signaled in the bitstream at the LCU level as a LCU level syntax element, wherein the ALF mapping information maps one or more of the sets of ALF information to one or more LCU's of the frame of video data; and
    means for performing an ALF process for the one or more LCU's of the frame of video data based on the ALF information mapped.

55. A non-transitory computer-readable storage medium having stored thereon instructions that, when executed, cause one or more processors of a device to:
    store sets of filter information in the memory, wherein the sets of filter information include sets of sample adaptive offset (SAO) information, the SAO information comprising data indicative of offset values;
    receive and apply a set of SAO information signaled in a bitstream at the largest coding unit (LCU) level as a LCU level syntax element, wherein applying includes applying the received set of SAO information to a first LCU of a frame of video data;
    receive mapping information signaled in the bitstream at the LCU level as a LCU level syntax element, wherein the received mapping information is directed to a second LCU, wherein the first and second LCU's are different LCU's;
    apply a set of SAO information applied to another LCU to the second LCU based on the mapping information directed to the second LCU; and
    perform SAO processes for each of the first and second LCU's based on the set of SAO information applied to each LCU.

56. The non-transitory computer-readable storage medium of claim 55, wherein the sets of filter information further include sets of adaptive loop filter (ALF) information, wherein each set of ALF information includes information relating to filter coefficients, the non-transitory computer-readable storage medium further having stored thereon instructions that, when executed, cause one or more processors of a device to:
    receive ALF mapping information signaled in the bitstream at the LCU level as a LCU level syntax element, wherein the ALF mapping information maps one or more of the sets of ALF information to one or more LCU's of the frame of video data; and
    perform an ALF process for the one or more LCU's of the frame of video data based on the ALF information mapped.

\* \* \* \* \*